(12) United States Patent
Hayes

(10) Patent No.: US 6,738,911 B2
(45) Date of Patent: May 18, 2004

(54) METHOD AND APPARATUS FOR PROVIDING CLIENT-BASED NETWORK SECURITY

(76) Inventor: Keith Hayes, 7528 Sweetgum, Irving, TX (US) 75063

( * ) Notice: Subject to any disclaimer, the term of this patent is extended or adjusted under 35 U.S.C. 154(b) by 572 days.

(21) Appl. No.: 09/775,763

(22) Filed: Feb. 2, 2001

(65) Prior Publication Data

US 2002/0170005 A1 Nov. 14, 2002

(51) Int. Cl.[7] .................. G05D 11/00; G01R 11/56; G06F 17/30
(52) U.S. Cl. .................. 713/201; 700/291; 700/90; 700/286; 700/412; 709/200; 709/246
(58) Field of Search .............................. 713/201; 707/4, 707/10, 100, 102, 104.1; 709/200, 201, 202, 203, 246; 700/291, 286, 90; 705/412

(56) References Cited

U.S. PATENT DOCUMENTS

| | | | | |
|---|---|---|---|---|
| 5,918,004 A | * | 6/1999 | Anderson et al. | 714/38 |
| 6,446,110 B1 | * | 9/2002 | Lection et al. | 709/203 |
| 6,505,086 B1 | * | 1/2003 | Dodd et al. | 700/65 |
| 6,519,598 B1 | * | 2/2003 | Nishizawa et al. | 707/10 |
| 6,601,065 B1 | * | 7/2003 | Nelson et al. | 707/4 |
| 6,601,071 B1 | * | 7/2003 | Bowker et al. | 707/102 |

* cited by examiner

*Primary Examiner*—Ly V. Hua

(57) ABSTRACT

The present invention is a method and apparatus for monitoring a computer network. When characterized as a method, the present invention initially obtains data from a log file associated with a device connected to the computer network. Next, individual items of data within the log file are tagged with XML codes, thereby forming a XML message. The device then forms a control header. Afterwards, the control header is appended to the XML message and sent to the collection server. Finally, the XML message is analyzed, thereby allowing the computer network to be monitored.

15 Claims, 2 Drawing Sheets

METHOD AND APPARATUS FOR PROVIDING CLIENT-BASED NETWORK SECURITY

BACKGROUND OF THE INVENTION

1. Technical Field

The present invention relates generally to enhancing the security of computer networks. Specifically, client machines and other devices connected to a computer network gather data that is used to identify security threats, then transport this data to another computer system where it is analyzed.

2. Description of the Related Art

Securing computer networks from viruses, Trojan horses, access by unauthorized user, and the like continues to be an ongoing project for network administrators and others involved with maintaining computer networks. Many software programs and hardware devices have been and are being developed whose sole purpose is to prevent breaches of a network's security system. However, those who would like to gain unauthorized access to computer networks or launch viruses or denial of service attacks (collectively "hackers") continue to develop programs and processes for overcoming these security advancements.

One of the many problems faced by those who would like to thwart the hackers' efforts is that computer networks are becoming larger and more distributed. Another problem is that with the rise of the Internet, these computer networks are exchanging more and more data with other networks and entities. This combination can create many "entry points" into a network. While it is possible to identify and defend these possible entry points, hackers have learned that they can spread their attack across several of these points, thus minimizing the chances that their presence will be detected at any one point.

Thus, there exists a need for a network security system designed to cover all of these potential entry points into a network. Also, this security system should be coordinated so that suspicious activity at one entry point can be correlated with similar activity at other points. This correlation should allow a network administrator to identify attacks that may go undetected at a single point, but can be identified when the network is examined as a whole.

SUMMARY OF THE INVENTION

Generally, the present invention is a method and apparatus for monitoring a computer network. When characterized as a method, the present invention initially obtains data from a log file associated with a device connected to the computer network. Next, individual items of data within the log file are tagged with XML codes, thereby forming a XML message. The device then forms a control header. Afterwards, the control header is appended to the XML message and sent to the collection server. Finally, the XML message is analyzed, thereby allowing the computer network to be monitored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
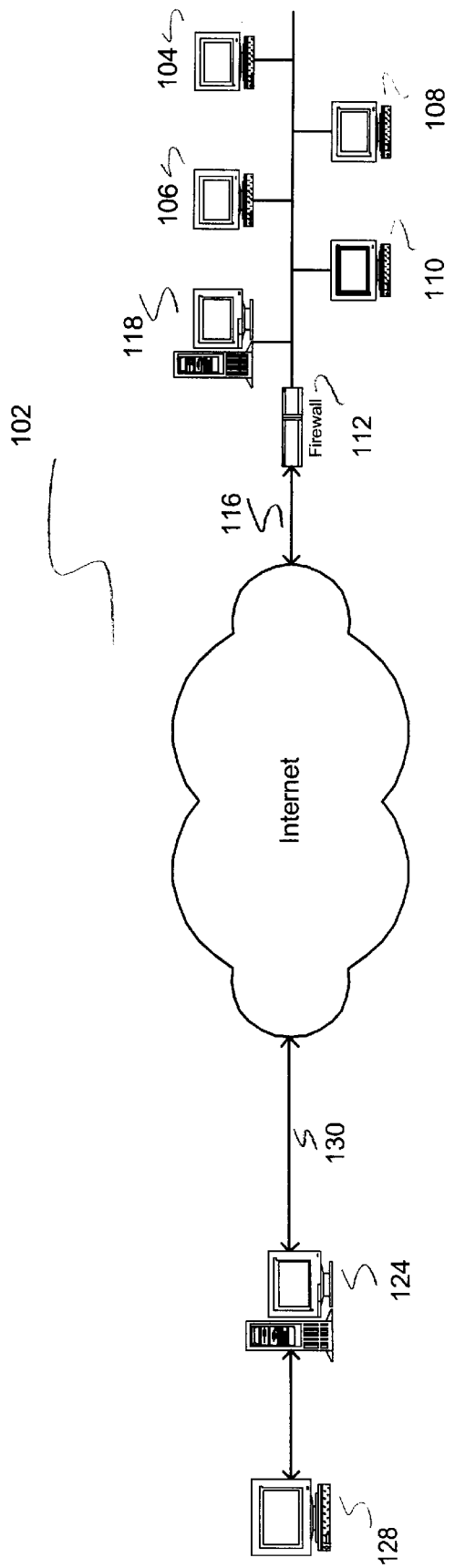
FIG. 1 illustrates a communications network and a series of computers upon which the present invention can be implemented.

FIG. 1 illustrates an example of how the present invention is implemented on a typical network system. Attached to the local area network 102 are devices 104–110. Generally, these devices include servers, routers, PCs, work stations, network intrusion detection devices, and file and Internet servers. Also attached to LAN 102 is firewall 112. LAN 102 is connected to the Internet through firewall 112 and Internet connection 116.

There are innumerable variations on the network described above. For example, LAN 102 can be comprised of an Ethernet network, a fiber optic network, or an alternative network. Likewise, any routers connected to LAN 102 can link to additional sub-networks. In addition, devices other than the ones mentioned above can be connected to LAN 102. With respect to Internet connection 116, it may be connected to firewall 112, then connected directly to a web server, without ever passing data over LAN 102. Thus, devices 104–110, LAN 102, firewall 112, and Internet connection 116 are simply a representative example of a network upon which the present invention can be implemented.

Also connected to LAN 102 is relay server 118. As will be described below, relay server 118 collects, formats, and relays data received from devices 104–110 and firewall 116. This data is then relayed to server 118 and expert system 126 via Internet connection 116. In some instances, relay server 118 can be equipped with a modem to make a direct connection with server 124 in the event that a connection cannot be made via the Internet.

Collection server 124 and expert system 128 are also connected to the Internet by means of connection 130. Collection server 124 receives the data collected from relay server 118. This data is then sent to expert system 128 for analysis.

In operation, devices 104–110 are involved in the transportation of network and/or Internet data. As part of handling the transportation of such data, devices 104–110 generate what are known as log files. Log files contain records of events that have occurred during a particular device's handling of network and/or Internet data. A variety of different records are typically stored in a log file. For example, records often describe the identity of an entity accessing a device, the nature of the entity's access, the type of data, or packets, received and sent by the device, invalid or improperly formatted data, and the like.

As the log files are created by devices 104–110, they are transmitted to relay server 118. This transfer is accomplished in one or two ways. First, a client program operating according to the present invention can be placed on each device. This client program, as will be described in more detail below, operates concurrently with the other processes executing on the device. One purpose of this program is to periodically monitor the creation of a log file by the device, and to send the most recent information in the log file to relay server 118. In the alternative, if such a program cannot be executed by a device, the device can be configured to automatically send the information in the log file directly to relay server 118.

Figure 2:
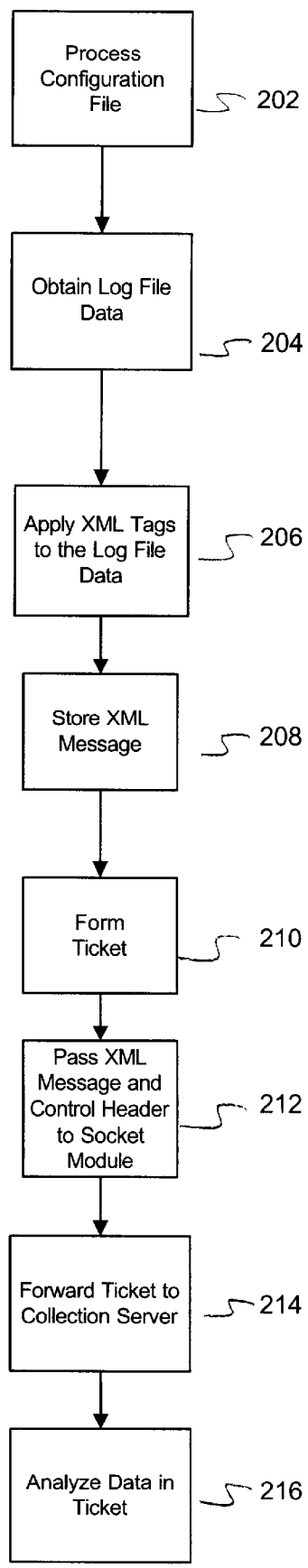
FIG. 2 is a flowchart that depicts a method by which the present invention operates.

FIG. 2 is a flow chart that depicts the execution of a client program operating on a particular device for transmitting log file information to a relay server and the handling of that information by the relay server. Upon initialization, the client program processes a configuration file associated with the program (202). The configuration file contains a device identification code, a customer identification code, and a group identification code. The device ID uniquely identifies the device, whereas the customer ID identifies the device and other similarly situated devices. Like the customer ID, the group ID identifies the device and other devices. However, the number of devices sharing the same group ID is generally larger than the number of devices that share a given customer ID. Programs operating according to the present invention that are in communication with one another use the IDs described above to communicate with each other in a manner similar to the way IP addresses are typically used.

Next, the client program obtains raw log file data from the device's log file (204). The program then analyzes the log file data and applies the appropriate XML tags to the data (206). This analyses requires the client program to classify the entries in the log file. Also, since this analyses will be different for each type of device, this portion of the program is usually required to be specially written for the type of device on which it is operating. Optimally, a separate XML tag is available for each type of data that may be present in a log file. An example of an unformatted log file entry is shown below:

Oct 27 11:20:12 polaris sshd[1126]:fatal: Did not receive ident string

After the log file entry has been formatted with the appropriate XML tags, it appears as follows:

<LINUXSL>

<LOG>

<DATE>Oct 27</DATE>

<TIME>11:20:12</TIME>

<HOST>polaris</HOST>

<PROCESS>sshd[1126]:</PROCESS>

<MESSAGE>fatal: Did not receive ident string</MESSAGE>

</LOG>

</LINUXSL>

Although different devices create different types of log files, most devices create entries that have some commonality. For example, most log file entries are time and date stamped, and consist, in part, of an informational message. The same XML tags are used on these similar log file records to enhance the benefit of using XML to classify the log file records. After labeling the log file data with the appropriate XML tags, the client program inserts the newly-formed XML message into a buffer that has been allocated to store the message (208).

The client program then forms a ticket in preparation of sending the XML message to another device (210). A ticket is composed of two portions: a control header and a control ticket. The control header is actually sent, along with the XML message, to other devices executing programs that operate according to the present invention. The control ticket is not sent to other devices, but is used by other subroutines within the program.

Several different data fields are contained in the control header. Some of the names of these fields are DESTINATION ADDRESS, CONTROL LOGIC, TIMEOUT, and NEXTPAYLOADSIZE. The DESTINATION ADDRESS field contains the ID of the ultimate destination of the XML message. This ID is expressed as a device, customer, or group ID, as discussed above. The CONTROL LOGIC field contains a code that describes how a program that receives the XML message should treat the message. Several different types of control logic codes can be processed by the present invention. The chart found below lists the various control logic codes, and the actions the program takes upon processing the control logic code.

| Transmission Command Code | Action |
|---|---|
| CLOGIC_SEND | Send ticket with data to devices(s) described in the DESTINATION field. |
| CLOGIC_RECV | Send ticket with request for data to devices(s) described in the DESTINATION field |
| CLOGIC_EXCH | Send ticket with data & request for data to devices(s) described in the DESTINATION field |
| CLOGIC_RELAY | Send ticket with data & request to relay the message to devices(s) described in the DESTINATION field. A request to relay can be sent to devices that are not identified in the DESTINATION field. Upon receipt of such a message, a device examines the DESTINATION field to determine whether it can forward the message on to the ultimate destination. |
| CLOGIC_BEACON | Send ticket with notification of connectivity loss to devices(s) described in the DESTINATION field |
| CLOGIC_ECHO | Send ticket to devices(s) described in the DESTINATION field with request to send back to the originating device |
| CLOGIC_ERROR | Send ticket with notification of error to devices(s) described in the DESTINATION field |
| CLOGIC_BCAST | Send ticket with request to devices(s) described in the DESTINATION field to subsequently broadcast the message to other devices described by the value in the DESTINATION field |
| CLOGIC_MCAST | Send ticket to devices(s) described in the DESTINATION field with request to send to all other devices |
| CLOGIC_DONE | Send ticket to devices(s) described in the DESTINATION field to end previous transmission |

The TIMEOUT filed contains a time value which specifies the maximum amount of time the message has to be successfully transmitted to another device. If the transmission is not successful within the specified time, a transmission error is recorded and the message discarded. The NEXTPAYLOADSIZE informs the device receiving the message how much data it should expect to follow the control header.

The control ticket is formed at the same time as the control header, but is used internally by the program. The fields found in a control ticket include: TICKET NUMBER, LOCATION OF DATA TO SEND, and SIZE OF DATA TO SEND. The TICKET NUMBER field represents a location where a unique ticket number can be placed. The LOCATION OF DATA TO SEND field specifies the internal location of the data to be sent along with the control header. Finally, the SIZE OF DATA TO SEND field specifies the amount of data to be sent.

Once a message is formed, it can be handled in one of several ways, depending upon the information contained in the XML message. If the XML message contains information related to system events that occur fairly often, such as system time updates and heartbeats, the ticket is stored in a system event queue. Items placed in the system event queue are not immediately transmitted to a relay server, but are stored, and are periodically sent as a group to the relay server. However, the relay server can send a message to the client program requesting that all items in the system queue be sent immediately. The relay server may send such a message if a network security breach has been detected and the server needs to get all information possible from the network to evaluate the breach.

XML messages that relate to log file entries are placed into a data transaction queue and sent immediately to the relay server. However, if the program cannot communicate with the relay server, these messages stay in the data transaction queue until communications are restored between the program and the server. Once communications are restored, all items in the data transaction queue are sent to the relay server.

Once the decision is made to transmit the ticket to the relay server, a socket routine extracts the tickets from the queues and transmits the control header and XML message (212). These items are appended together to form a single message. To add additional security to these transmissions, a virtual private network can be established between the device upon which the client program is executing and the relay server.

After the message is received by the relay server, the message is ultimately forwarded to a collection server (214). Between the device where the message originates and the collection server, a number of other devices may exists. By inserting the CLOGIC_RELAY command in the CONTROL LOGIC field, devices between the sending device and the collection server are directed to forward the ticket on to the collection server. Devices are aware of their neighboring device by periodically exchanging status message. The programs operating on the devices keep track of the origination address of these messages, much like a router. This, in turn, enables the programs to know which other programs are connected to a network at a given time.

The collection server continually gathers tickets from devices on a network or series of related networks, strips the log file information from the ticket, and inserts this information into a structured file, such as a database file.

Once the log file information has been inserted into a database system, the expert system then analyzes the data (216). The expert system looks for trends and known patterns which could indicate a problem with the network, or indicate that someone or some program is trying to gain unauthorized access to the network or otherwise performed unauthorized activities within the network (e.g., plant a virus, delete files, etc.). If such trends are spotted, the network administrator can then take appropriate actions.

As indicated above, aspects of this invention pertain to specific "method functions" implementable through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for monitoring a computer network, comprising:
   obtaining data from a log file associated with a device connected to the computer network;
   tagging individual items of data within the log file with XML codes, thereby forming a XML message;
   forming a control header, wherein the control header contains control codes;
   appending the control header to the XML message, and sending the control header and XML message to a collection server; and
   analyzing the XML message, wherein the computer network is monitored.

2. The method as described in claim 1, further comprising:
   forming a control ticket, wherein the control ticket contains location information that describes where the XML message is located in the device; and
   passing the control header and the control ticket to a queue.

3. The method as described in claim 2, further comprising:
   sending the XML messages to the collection server; and
   inserting items of information from the XML message into a database.

4. The method as described in claim 3, wherein the control codes in the control header dictate how devices that receive the XML message process the XML message.

5. The method as described in claim 4, further comprising processing an initialization file, wherein the XML Message contains a device ID, which is unique to the device, a customer ID, which uniquely identifies a group of similarly situated devices, and a group ID, which uniquely identifies another group of similarly situated devices, with the group of devices identified by the group ID being larger that the group of devices identified by the customer ID.

6. An apparatus for monitoring a computer network, comprising:
   a device, connected to the computer network; and
   a collection server, also connected to the computer network, the device and collection server being operable in a particular mode of operation, wherein
   the device obtains data from a log file associated with the device;
   the device tags individual items of data within the log file with XML codes, thereby forming a XML message;
   the device forms a control header, wherein the control header contains control codes;
   the device appends the control header to the XML message, and sends the control header and XML message to the collection server; and
   the collection server analyzes the XML message, wherein the computer network is monitored.

7. The apparatus as described in claim 6, wherein the particular mode of operation further includes the device:
   forming a control ticket, wherein the control ticket contains location information that describes where the XML message is located in the device; and
   passing the control header and the control ticket to a queue.

8. The apparatus as described in claim 7, wherein the particular mode of operation further includes the device:
   sending the XML messages to the collection server; and
   the collection server inserting items of information from the XML message into a database.

9. The apparatus as described in claim 8, wherein the control codes in the control header dictate how devices that receive the XML message process the XML message.

10. The apparatus as described in claim 9, wherein the device is associated with an initialization file that contains a device ID, which is unique to the device, a customer ID, which uniquely identifies a group of similarly situated devices, and a group ID, which uniquely identifies another group of similarly situated devices, with the group of devices identified by the group ID being larger that the group of devices identified by the customer ID.

11. An apparatus for monitoring a computer network, comprising:

a device, connected to the computer network; and a collection server, also connected to the computer network, the device and collection server being operable in a particular mode of operation, wherein gathering meas for obtaining data from a log file associated with a device connected to the computer network;

tagging means for tagging individual items of data within the log file with XML codes, thereby forming a XML message;

control header formation means for forming a control header, wherein the control header contains control codes;

appending means for appending the control header to the XML message;

sending means for sending the control header and XML message to a collection server; and analyzation means for analyzing the data message, wherein the computer network is monitored.

12. The apparatus as described in claim 11, further comprising:

control ticket formation means for forming a control ticket, wherein the control ticket contains location information that describes where the XML message is located in the device; and control header passing means for passing the control header and the control ticket to a queue.

13. The apparatus as described in claim 12, further comprising:

message sending means for sending the XML messages from the device to the collection server; and insertion means for inserting items of information from the XML message into a database.

14. The apparatus as described in claim 13, wherein the control codes in the control header dictate how devices that receive the XML message process the data message.

15. The apparatus as described in claim 14, wherein the device is associated with an initialization file that contains a device ID, which is unique to the device, a customer ID, which uniquely identifies a group of similarly situated devices, and a group ID, which uniquely identifies another group of similarly situated devices, with the group of devices identified by the group ID being larger that the group of devices identified by the customer ID.

* * * * *